(12) United States Patent
Washburn et al.

(10) Patent No.: US 7,430,291 B2
(45) Date of Patent: Sep. 30, 2008

(54) COMMON MODE TRANSMISSION LINE TERMINATION

(75) Inventors: Robert D. Washburn, Malibu, CA (US); Robert F. McClanahan, Valencia, CA (US)

(73) Assignee: Thunder Creative Technologies, Inc., Malibu, CA (US)

( * ) Notice: Subject to any disclaimer, the term of this patent is extended or adjusted under 35 U.S.C. 154(b) by 286 days.

(21) Appl. No.: 10/933,825

(22) Filed: Sep. 2, 2004

(65) Prior Publication Data

US 2005/0057276 A1    Mar. 17, 2005

Related U.S. Application Data

(60) Provisional application No. 60/499,824, filed on Sep. 3, 2003.

(51) Int. Cl.
*H04M 9/00*    (2006.01)
(52) U.S. Cl. ...................................... 379/398
(58) Field of Classification Search ........................ None
See application file for complete search history.

(56) References Cited

U.S. PATENT DOCUMENTS

| | | | | |
|---|---|---|---|---|
| 3,832,646 A | * | 8/1974 | Szabo et al. | 330/258 |
| 5,138,287 A | * | 8/1992 | Domokos et al. | 333/12 |
| 5,659,273 A | * | 8/1997 | Harpham | 333/22 R |
| 6,677,829 B2 | * | 1/2004 | Maki et al. | 333/22 R |
| 6,724,890 B1 | * | 4/2004 | Bareis | 379/394 |
| 2002/0159548 A1 | * | 10/2002 | Evans et al. | 375/346 |

* cited by examiner

*Primary Examiner*—Ramnandan Singh
(74) *Attorney, Agent, or Firm*—J. D. Harriman, II; DLA Piper US LLP (57)    ABSTRACT

The present invention provides termination for transmission line structures propagating common mode signals. Common mode signals typically represent noise in systems wherein information is transmitted as differential mode signals. The present invention terminates the common mode signals in a dynamically matched termination that prevents or significantly reduces reflection of said common signals without interference with differential mode transmission lines or their normal operation. Application is shown for an unshielded, twisted pair transmission line as commonly used in telephony-based systems for both voice and broadband data communication. The methods for application of the present invention to systems with large numbers of conductors are also shown.

3 Claims, 7 Drawing Sheets

COMMON MODE TRANSMISSION LINE TERMINATION

CROSS-REFERENCE TO RELATED APPLICATION(S)

The present application claims the benefit of priority from pending U.S. Provisional Patent Application No. 60/499,824, entitled "Common Mode Transmission Line Termination", filed on Sep. 3, 2003, which is herein incorporated by reference in its entirety.

BACKGROUND OF THE INVENTION

1. Field of the Invention

The present invention relates to the field of dynamic, impedance matched, transmission line terminations for common mode signals.

2. Background Art

Transmission lines play an important role in many fields of electronics and are particularly important in communications. Transmission line properties result from the geometrical relationships among conductors and ground structures and the properties of the conducting and insulating materials that form them. As a result, transmission lines are realized in various forms such as coaxial cables, twisted pairs of lines (both shielded and unshielded), microstrip and stripline structures. The quality of a transmission lines (the extent to which its performance approaches that of an ideal transmission line) can vary considerably and the choice is heavily influenced by the requirements of the specific application.

Discussion of the present invention will focus on an application with unshielded, twisted pair lines in a broadband communication application (digital subscriber line or DSL). This application reflects use of a "poor" quality line that is highly susceptible to both pick-up and sourcing of common mode noise signals. Of course these same twisted pair lines are "good" quality for their original design application—as a telephone line to transmit voice communication signals that are limited to under 4 KHz.

Figure 1A:
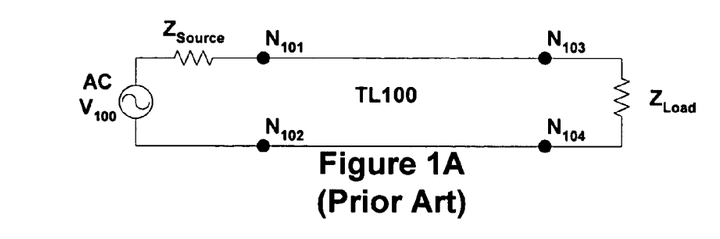
FIG. 1A is a circuit diagram of a prior art doubly terminated, transmission line.

Referring to FIG. 1A, a typical transmission line is symbolically illustrated. Transmission line TL100 has its source or input port between nodes N101 and N102 and its terminal or output port between nodes N103 and N104. TL100 is fully symmetric with input and output ports. Voltage source V100 generates the input signal, which may be of arbitrary form. ZSOURCE is the termination impedance for the input port of TL100 and includes the source resistance of V100. ZLOAD is the termination impedance for the output port of TL100. The principal or defining electrical characteristic of a transmission line is its characteristic impedance (Z). For TL100 representing an ideal (lossless) transmission line with characteristic impedance Z, under the "matched" condition where ZSOURCE and ZLOAD are equal to Z, an input signal generated V100 will propagate undistorted to ZLOAD. Under this condition, half of the signal power will be dissipated in ZLOAD and half in ZSOURCE.

Figure 1B:
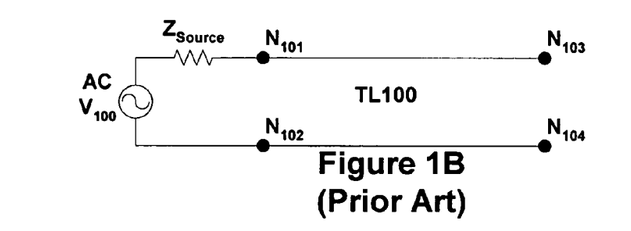
FIG. 1B is a circuit diagram of the prior art transmission line of FIG. 1A with unterminated (open circuit) terminal port.

For the condition where ZLOAD does not equal Z, a portion of the propagating signal would be reflected back to the source where a portion of the reflected signal would be further reflected back toward the load if ZSOURCE also does not equal Z. FIG. 1B illustrates the condition in which ZLOAD is an open circuit, resulting in total reflection of the propagating signal power back to the source.

Clearly, any physically realizable transmission line will not be ideal and cannot be lossless. The propagating signal will therefore be attenuated and distorted as a function of frequency to at least some degree. Generally, these are characterized or modeled on a per-unit-length basis, but will clearly become more significant with increasing transmission line length.

The above discussion represents a very brief, non-mathematical summary of classical transmission line theory. What is not discussed in classical transmission line theory is the fact that the transmission line system illustrated in FIG. 1A, designed for transmission of differential mode signals produced by source V100, also represents a transmission line system for common mode signals that are picked up by the conductors. Since common mode signals are easily converted to differential mode and will be partially converted whenever they encounter an imbalance in impedance-to-ground, they can represent a significant source of signal distortion and noise, including crosstalk, to the desired signal propagation through transmission line TL100.

The common mode transmission line is comprised of the same physical structure as that for propagating the differential signals from source V100 to termination impedance ZLOAD. However, it represents one or more different type of transmission line structure with different electrical characteristics including characteristic impedance, signal velocity of propagation, and frequency characteristics. In some ways it can appear to function as a transmission line composed of a single conductor proximate to a ground plane. In other ways, it can appear to function as two of these types of lines in parallel. Creation of common mode transmission line models or mathematical descriptions of their operation for any of the numerous transmission line topologies is not the purpose of this teaching. The most significant fact is that no "matched" termination is provided the common mode, allowing these signals to reflect and bounce around until converted to harmful differential noise by circuit non-linearity or impedance imbalance. It would therefore be highly desirable to provide a matched transmission line termination for common mode signals that would not interfere with the normal operation of the transmission line in propagating differential mode signals.

Figure 1C:
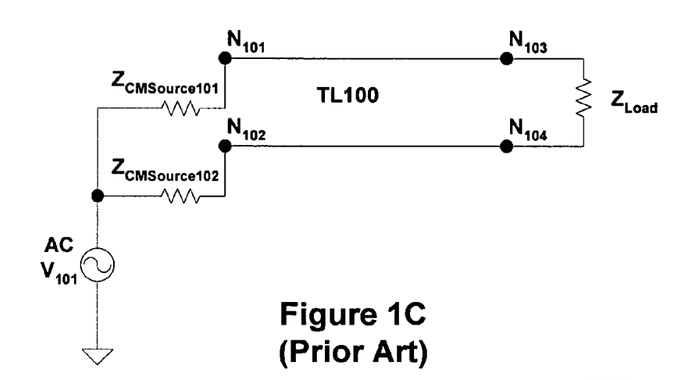
FIG. 1C is a circuit diagram of the prior art transmission line of FIG. 1A with an unterminated (open circuit) input port in the presence of a common mode signal source.

FIG. 1C illustrates the generation, coupling, and transmission line propagation of common mode signals. Differential signal source V100 and impedance ZSOURCE are not shown to simplify the drawing. Source V101 is a ground referenced differential signal source. Source V101 would typically be one of many which would be distributed along the length of transmission line TL100. Sources injecting common mode at points other than terminal ports of transmission line TL100 cause common mode signals to propagate in both directions in said transmission line, implying the desirability of terminating common mode at both termination ports of transmission line TL100 (and even at any significant discontinuities existing between said ports). Source V101 typically would represent a noise source including signals generated and conducted on adjacent transmission lines, a noise source either internal or external to the system(s) of which transmission line TL100 is a part, and even signal source V100 which can source both differential and common mode signals into transmission line TL100.

Impedances ZCMSOURCE101 and ZCMSOURCE102 are the source impedance for the noise source to each line of transmission line TL100. They include the internal source impedance of source V101 that is common to both source impedances. Any mismatch between impedances ZCMSOURCE101 and ZCMSOURCE102 will result in proportionate conversion of the common mode signal to differential that will then propagate along transmission line TL100 with the desired signal from source V100. Since impedances ZCMSOURCE101 and ZCMSOURCE102 are not short or open circuits, they will provide some common mode signal termination at the point of noise injection but this is not likely to be even close to providing a match condition.

Finally, it should be noted that common mode signals present at nodes N103 and N104 produce no current flow or power dissipation within differential transmission line termination ZLOAD. For common mode signals, ZLOAD can be replaced with the open circuit shown in FIG. 11B without impact on common mode signals, again illustrating the need (in many applications) to provide a common mode termination for transmission line TL100.

Figure 1D:
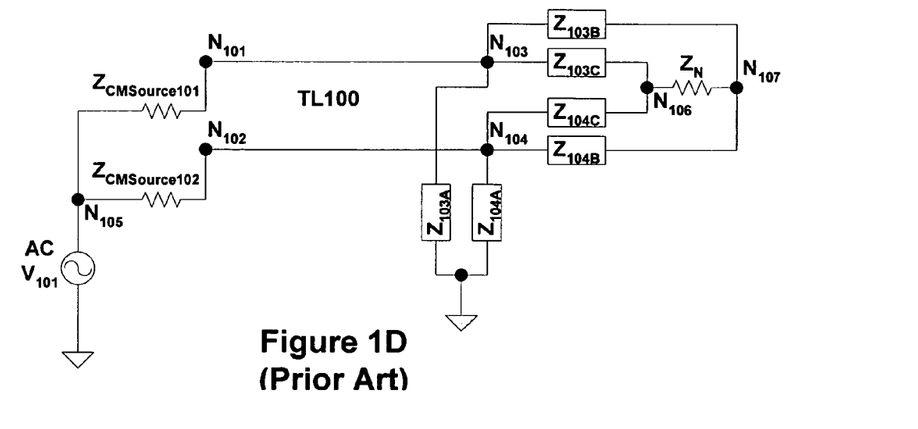
FIG. 1D is a circuit diagram of the prior art transmission line of FIG. 1A with a doubly unterminated (open circuit) input port in the presence of a common mode signal source.
Figure 1E:
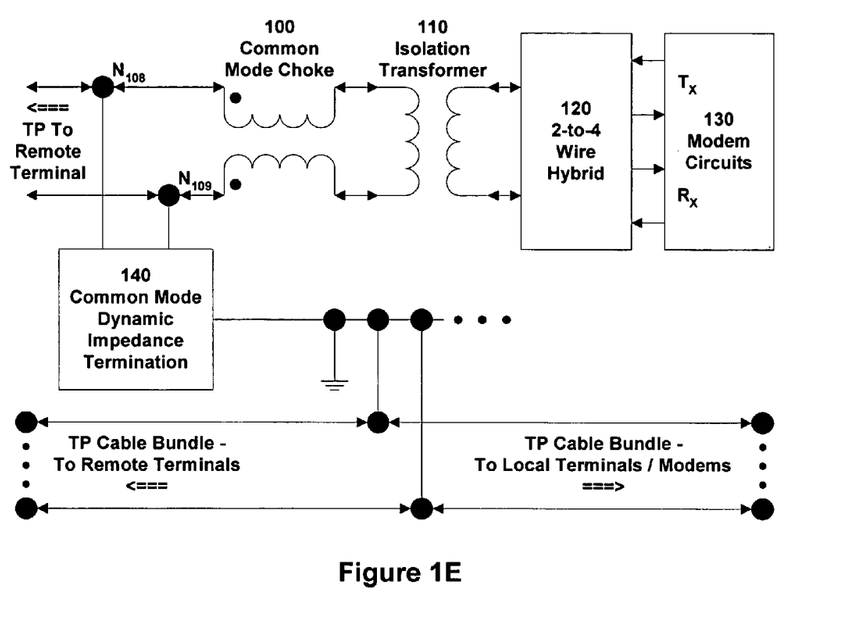
FIG. 1E is a block diagram according to one embodiment of the present invention.

FIG. 1D further illustrates the desirability to provide a true common mode, matched, transmission line termination rather than simply mitigate any imbalance in parasitic impedance from each line to ground. Such mitigation might be accomplished by adding precision, matched, "low" value resistors from each line to ground to swamp out the existent impedances. With this approach, the added resistors will also load the differential signal and must be accounted for in the overall circuit design. Mitigation might also be accomplished by adding a resistor to one line or the other to directly reduce but not eliminate the imbalance between the parasitic line impedances to ground.

In FIG. 1D, impedances Z103A and Z104A represent said parasitic impedances from each line to ground. ZN represents the impedance of a circuit branch coupling nodes N106 and N107 within the electronic circuitry using or associated with the output port signal of transmission line TL100. Impedances Z103B and Z104B are parasitic impedances coupling node N107 to nodes N103 and N104 respectively. Impedances Z103C and Z104C are parasitic impedances coupling node N106 to nodes N103 and N104 respectively. Impedances Z106A and Z107A respectively couple nodes N106 and N107 to ground. Impedances Z106A and Z107A provide the ground reference for common mode signal conversion and can represent parasitic capacitance, or actual components in the load circuit, or even zero if either node N106 or N107 is a ground connection. For conditions where there is an imbalance between impedances Z103B and Z104B or equivalently between impedances Z103C and Z104C (as there always will be to some extent), common mode signals are partially converted to differential signals that then appear across ZN, injecting noise directly into the circuitry. Presence of a common mode line termination coupled with proper blocking of common mode signals and isolation of the differential line termination can reduce this type of noise problem to relative insignificance.

SUMMARY OF THE INVENTION

The present invention is an electronic circuit that provides termination for common mode signals propagating in transmission line structures. The common mode transmission line termination provides a dynamically matched termination that prevents or significantly reduces reflection of the common signals without significant interference with differential mode transmission lines or their normal operation. The present invention provides the ability to reduce conversion of common mode noise to differential mode, thereby improving the signal-to-noise ratio of the communication system. In one or more embodiments, the present invention comprises of a passive circuit, and a transformer structure that substantially blocks differential mode signals and transmits common mode signals. In other embodiments, the present invention comprises of variable components for optimizing the common mode signal match for termination of transmission line structures.

In another embodiment, the present invention comprises an active circuit. In one or more embodiments, the present invention provides complex impedance matched termination for common mode transmission line structures. In one or more embodiments, the present invention comprises of DSP controlled variable components. In one or more embodiments, the present invention comprises means for matching the common mode termination of the common mode transmission line structure over the communication system operating frequency band. In one or more embodiments, the present invention provides common mode transmission line termination where said transmission lines comprise three or more common mode signal conductors. In one or more embodiments, the present invention comprises means for balancing the individual common mode transmission line terminations among the common mode signal conductors within the common mode transmission line structure.

DETAILED DESCRIPTION OF THE INVENTION

The present invention is directed to transmission line terminations for common mode signals. In the following description, numerous specific details are set forth to provide a more thorough description of embodiments of the invention. It will be apparent, however, to one skilled in the art, that the invention may be practiced without these specific details. In other instances, well known features have not been described in detail so as not to obscure the invention. Except as noted herein, common components and connections, identified by common reference designators function in like manner in each circuit.

The present invention enables common mode signals propagating in transmission line structures to be terminated, thereby preventing their reflection back down the line. Typically, common mode noise in systems is ignored unless the amplitude becomes so large as to potentially damage system components. This occurs because information is typically transmitted in differential mode and differential mode transmission line terminations do not draw current flow and therefore power from the common mode signal.

The major problem with this approach is that common mode signals are partially converted to differential by every nonlinear circuit structure encountered (active circuitry is filled with semiconductor junctions with their non-linear I-V and capacitance characteristics) or by every imbalance in the impedance to ground encountered. Similarly, differential noise is also easily converted in part to common mode in which form it can propagate on the common mode transmission line structure and then be partially converted back to differential mode and interfere with system performance. Common mode noise can be a major source of crosstalk among transmission lines that are placed in close proximity, and providing termination for these signals can be a major contributor to crosstalk reduction and improved system performance.

In the prior art figures shown (FIGS. 1A-1D), the active devices are bipolar junction transistors because their relatively constant voltage drop across junctions allows for formation of simple current sources with resistor control of the current values that are required to form the current mirrors. Current mirrors are particularly useful in applications where signals are substantially in the form of currents rather than voltages. This is not to imply that other devices cannot be utilized in addition to the mirrors. Field Effect Transistors (FETs) can be added in series with the transistor collectors and biased to further increase the impedance of the push-pull circuitry described below. FETs can also function as switches in the value control of the various variable passive components used.

Passive Embodiment Of The Present Invention

Figure 1F:
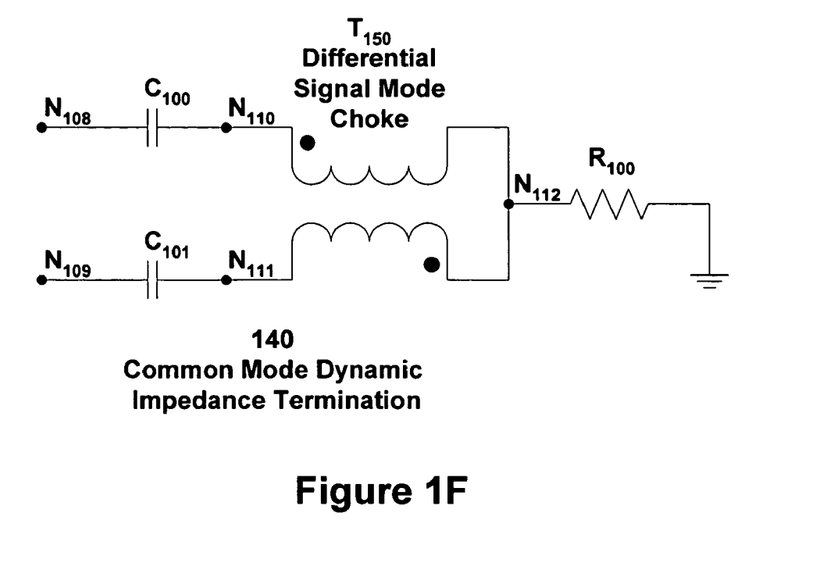
FIG. 1F is a circuit diagram of the present invention for a twisted pair transmission line, according to one embodiment of the present invention.

FIG. 1F illustrates a passive embodiment of the present invention for providing common mode, transmission line termination for unshielded, twisted pair lines. Said termination network is comprised of capacitors C100 and C101, transformer T150, and resistor R100 and is coupled to the twisted pair transmission line at nodes N108 and N109.

Capacitor C100 couples node N108 to the dotted end of winding 1 of transformer T150 at node N110. Capacitor C101 couples node N109 to the undotted end of winding 2 of transformer T150 at node N111. Capacitors C100 and C101 provide DC blocks to prevent dc loading of the twisted pair transmission line. Capacitance values for capacitors C100 and C101 are dependent on the lowest signal frequency (either common mode or differential mode) to be terminated. An alternate topology can position DC blocking capacitors C100 and C101 before the nodes (nodes N108 and N109 in FIG. 1F) where connections to the common mode and differential mode terminations separate. This configuration is meaningful only if the transmission line termination does not draw dc power from the transmission line. Any other system requirements such as operating bias point shifts, contact establishment and maintenance, communication of housekeeping information, and abnormal operation including connection termination must also be accommodated with the configuration.

Transformer T150 serves to pass common mode signals to line termination resistor R100 while blocking differential signals. It functions in a similar method to a "common mode choke" but the oppositional connection effectively makes it a "differential mode choke". A desirable configuration is to also have a complementary common mode choke before the termination for the differential mode signals.

Resistor R100 provides the common mode transmission line termination. A major problem associated with the passive embodiment of FIG. 1F is the determination of the value of resistor R100 that provides matched termination for the common mode transmission line. This results primarily because the nature of the ground is ill defined and the ground structure plays a major role in the determination of the impedance of a transmission line. The presence of a shield as part of the transmission line structure such as in coaxial cables, twisted shielded pair lines, and stripline structures will generally not help as the shield will just provide an additional path for common mode signal propagation.

One approach is to first disconnect termination resistor R100 from the circuit at node N112 and measure the common mode signal present at said node. Transmission line termination resistor R100 is then reconnected to the circuit at node N112 and its value adjusted so that the common mode signal present at node N112 is 50% of the value measured in the first step. This process is simplified if resistor R100 is variable, either as a single resistor or a more complex network configuration.

If a resistor termination (purely real in mathematical terms) is inadequate in specific applications, it can be replaced with a passive network of varying size and complexity, having complex impedance characteristics. Another alternative is to replace resistor R100 with an active circuit that automatically performs the matching function. This type of active network is in reality the active embodiment described below. The optimum configuration of the present invention effectively adds a "differential mode choke" to the transmission line before the circuitry comprising the active embodiment but after the transmission line splits (or is tapped) for coupling in the common mode termination of the present invention.

The embodiment shown in FIG. 1F is adequate for most applications wherein the common mode transmission lines typically can be matched within a few percent. This is particularly true with closely coupled transmission line conductors such as in twisted pair lines. It should be noted that some imbalances are present that can not only produce deviation from an ideal match, but can also actually convert common mode to differential noise. These include variations in the values of capacitors C100 and C101, imbalance in windings, coupling, and parasitic elements within transformer T150, and the tolerance variation of resistor R100. In addition, it should be noted that the match is actually a match for the average impedance of the two lines. These values will be very close for twisted pair lines but not identical. This averaging of line impedances becomes more significant in multi-conductor systems and is discussed in detail below.

Figure 1G:
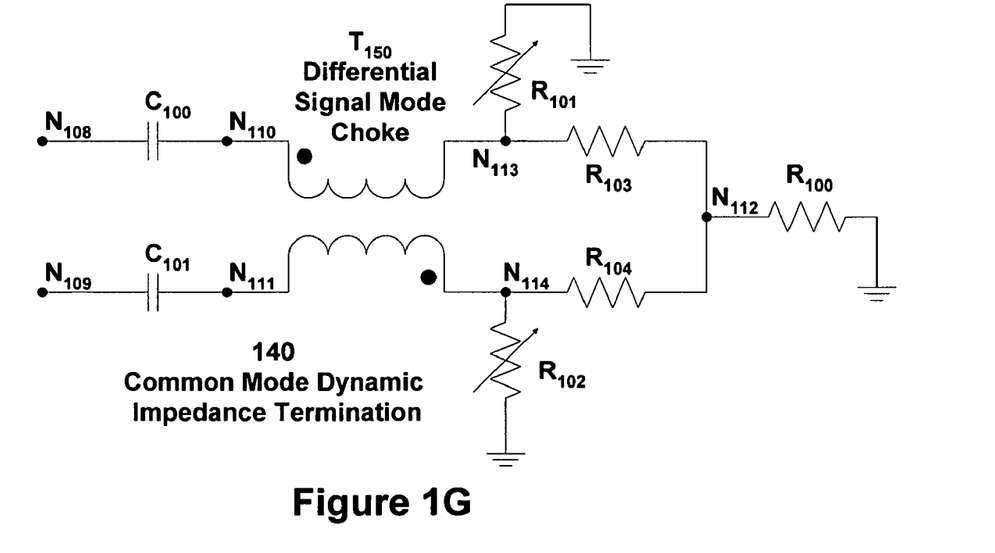
FIG. 1G is a circuit diagram of the present invention for a twisted pair transmission line with variable resistance to ground balance adjustment, according to another embodiment of the present invention.

For some applications, common mode transmission line impedance mismatches of even a few percent are inadequate. For said applications, the circuit shown in FIG. 1G provides added capability to improve the common mode termination match. Capacitors C100 and C101, transformer T150, and resistor R100 are common to the embodiment of FIG. 1G. Variable resistors R101 and R102 are provided to balance the resistance to ground on the output of transformer T150 at nodes N113 and N114. By proper adjustment while observing the output of the differential signal line (with no differential signal present) and minimizing the converted common mode signal present, an improved match can be obtained. Resistors R101 and R102 can be augmented or replaces with complex, frequency dependent networks that allow improvement of the termination across the frequency range of interest. Resistors R103 and R104 are low value balance resistors that should have the same value and tight tolerances.

Active Embodiment of the Present Invention

Figure 2A:
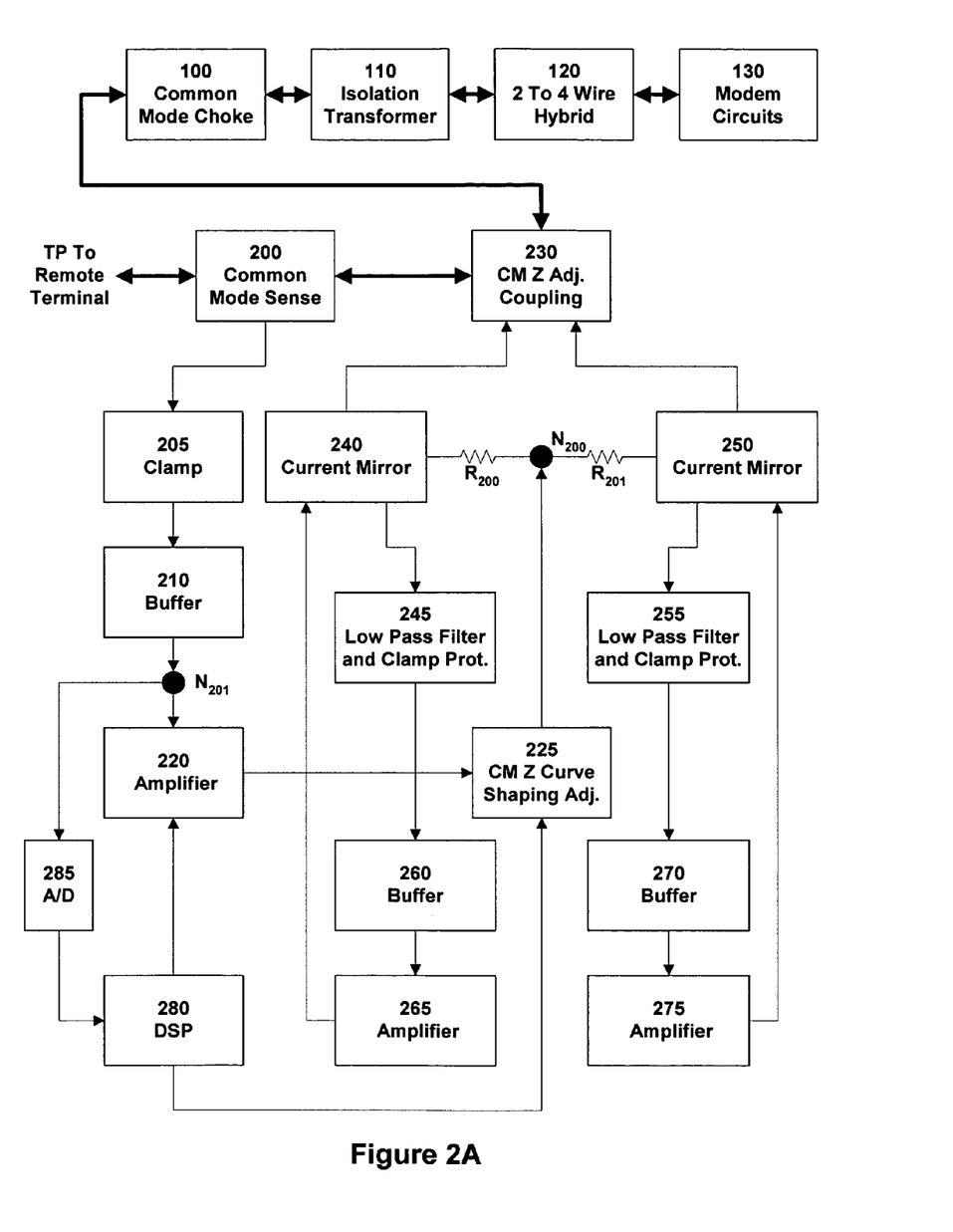
FIG. 2A is a block diagram of another embodiment of the present invention.

FIG. 2A is a functional block diagram of an active embodiment of the present invention for providing common mode, transmission line termination for unshielded, twisted pair lines. The specific application illustrated in FIG. 2A is for a digital subscriber line (DSL) communications system application. In DSL applications, crosstalk is a major performance limiting noise source and is comprised primarily of signals picked up from other unshielded twisted pair transmission lines present in the same cable bundle as the twisted pair transmission line referred to in FIG. 2A. Although the crosstalk noise will have been converted to differential mode to actually limit DSL system performance (both range and data rate), a major portion of crosstalk is originally common mode and it is the ease in which portions are converted to differential mode that makes common mode transmission line termination an essential part of the control of crosstalk in DSL systems.

Figure 3A:
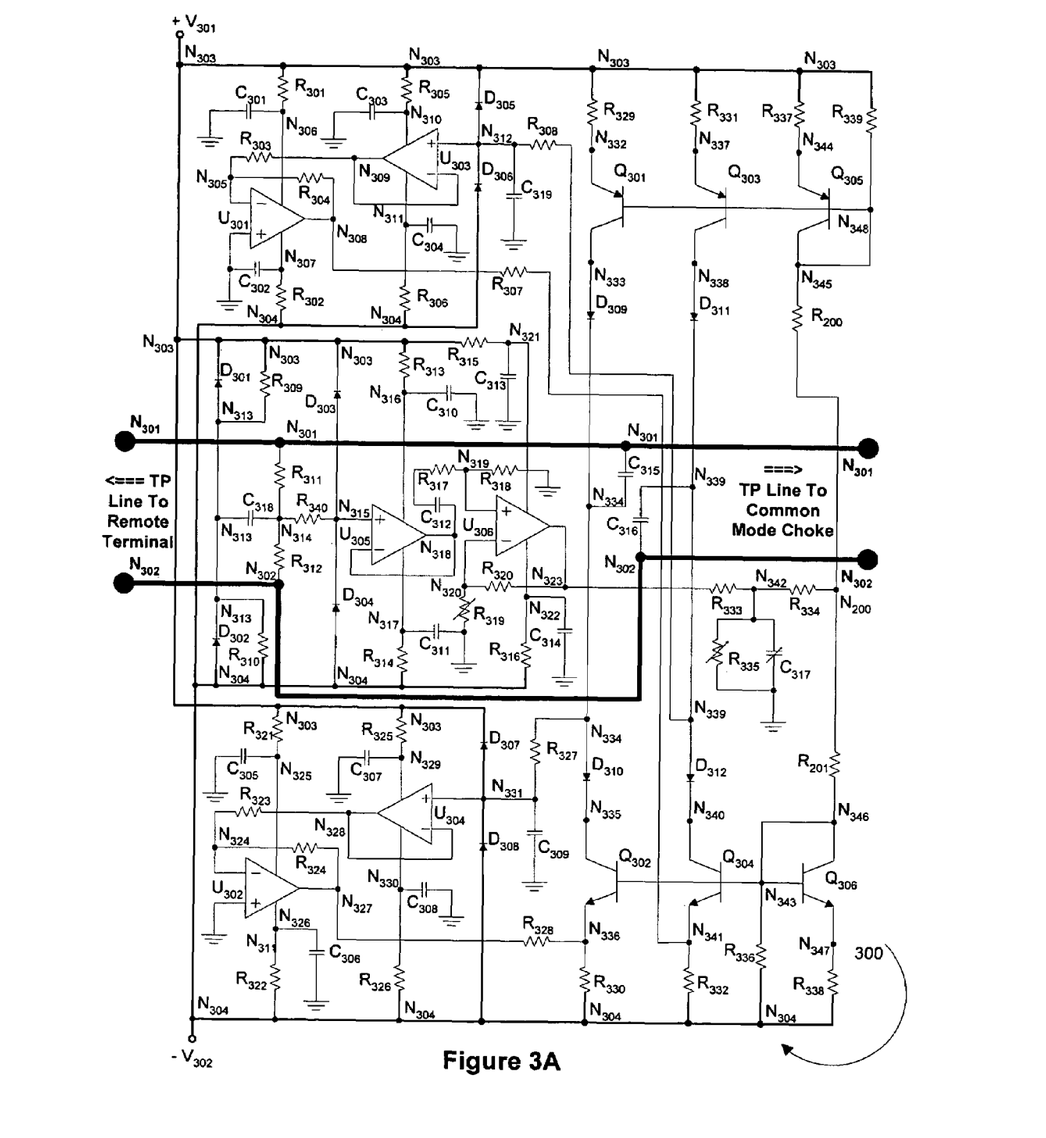
FIG. 3A is a circuit diagram of a preferred embodiment of the present invention for a twisted pair transmission line.

FIG. 3A is a circuit diagram of a preferred embodiment 300 of the present invention conforming to the functional block diagram shown in FIG. 2A. In the following discussions, FIG. 2A and the corresponding circuit elements of FIG. 3A that constitute the specific function will be discuss jointly.

Referring to FIG. 2A, common mode choke 100, isolation transformer 110, and 2 to 4 wire hybrid 120 are existent components of the analog front end (AFE) circuitry and an integral part of DSL modems. This is the case whether the DSL modem is at the consumer or at the Customer Premises Equipment (CPE) end of the twisted pair transmission line or on a multi-modem plug-in card at the central office (CO). In present DSL modems, common mode choke 100 is used to block RF signals picked up from external sources and only functions at frequencies that are well above any DSL signal transmission frequency band. This is done primarily to save surface area on circuit boards, particularly those located in the CO. Isolation transformer 110 transmits differential mode signals and has a ratio of secondary to primary winding turns that is typically within the range of 1:1 to 2:1. The 2-wire to 4-wire hybrid is a resistive bridge type network that separates transmitted and received signals. Separation depends on the mismatch in actual resistor values.

The circuit operates by sourcing or sinking common mode current signals into the transmission line. Said current signals from high impedance sources combine with the common mode signals present on said transmission line such that the amplitude of the resulting signal is half of the common signal present on the line with no signals being injected. Within the gain-bandwidth capability of the amplifiers in the circuit, the network will match the common mode transmission line characteristics across the operating band of interest. This is aided by controllable, passive circuitry that shapes the frequency response to reduce the gain, bandwidth, slewrate, and drive power requirements for the internal amplifiers.

Common mode sense 200 functions to detect the common mode signal present on the transmission line in close proximity to the actual common mode termination point (point where the termination correction signals described in the previous paragraph are injected). Common mode sense 200 comprises resistors R311 and R312 that are connected in series. The series combination of said resistors couples the two transmission line conductors together at nodes N301 and N302. Since the transmission line impedance will vary from around 50 to 200 ohms, values for R311 and R312 will typically range from a few thousand to several tens of thousand ohms. Node N314 is the connection point for the series combination of resistors R311 and R312. The voltage at node N314 with respect to ground is a representation of the average common mode signal present on the twisted pair transmission line. Resistors R311 and R312 typically will have the same value with very tight tolerances although it is possible to weigh the inputs from the 2 lines by using different values.

Clamp 205 is design to protect the circuitry against large transient voltages. Clamp 205 is comprised of 2 separate clamp circuits with the first being faster and the second oriented to specific protection of the input to buffer amplifier 210. The first clamp circuit limits the voltage at node N314 to approximately a diode drop above positive bias voltage +V301 at node N303 or below −V302 at node N304. The second clamp circuit limits the input voltage at the positive input to buffer amplifier U305 to the same values through separate circuitry. Differing clamp voltages can be provided to the 2 clamp circuits if available. Likewise differing clamp voltage levels can be provided for the positive and negative levels.

The first clamp circuit is composed of capacitor C318, diodes D301 and D302, and resistors R309 and R310. Capacitor C318 is intended to provide much lower impedance to fast transients than resistor R340 so that the first clamp circuit provides the majority of the protection. Capacitor C318 couples common mode voltage detection node N314 to the anode of diode D301 and the cathode of diode D302 at node N313. The cathode of diode D301 is coupled to positive bias voltage V301 at node N303 and the anode of diode D302 is coupled to negative bias voltage V302 at node N304. Diodes D301 and D302 provide the actual clamping function. Resistors R309 and R310 are connected in parallel with diodes D301 and D302 respectively, and provide 2 separate circuit functions. First, resistors R309 and R310 provide a discharge path for capacitor C318 after a transient voltage charges it. Second, resistors R309 and R310 bias node N313 at approximately the same level as node N314 with no common mode present, thereby maintaining substantially all of the available dynamic operating range of the common mode termination.

The second clamp circuit is composed of resistor R340 and diodes D303 and D304. Resistor R340 couples common mode sense 200 at node N314 to buffer amplifier 210 at node N315, the non-inverting input node for operational amplifier U305. Resistor R340 limits the current into second clamp circuit diodes D303 and D304 and the transient rise time at node N315 such that most of the transient energy flows through capacitor C318 and the first clamp circuit. The anode of diode D303 and the cathode of diode D304 are coupled to buffer 210 at node N313. The cathode of diode D301 is coupled to positive bias voltage V301 at node N303 and the anode of diode D302 is coupled to negative bias voltage V302 at node N304. Diodes D303 and D304 provide the actual clamping function.

Buffer 210 is comprised of operational amplifier U305, capacitors C310 and C311, and resistors R313 and R314. Buffer 210 provides isolation from the input signal detection and protection circuitry and a low impedance signal source to drive amplifier 220, the primary gain control amplifier in the termination circuitry, and possibly A/D converter 285 as well.

Operational amplifier U305 is configured for unity gain although it could be configured to provide some gain if said second configuration were desirable in a specific application. The output and inverting inputs of U305 are coupled to the input of amplifier 220 at node N318.

Capacitors C310 and C311 are power supply bypass capacitors for operational amplifier U305. Capacitor C310 couples the positive bias at node N316 to ground, and capacitor C311 couples the negative bias at node N317 to ground. Resistors R313 and R314, together with capacitors C310 and C311 form low pass filters for the respective positive and negative bias power supply inputs. These low pass filters, working in conjunction with similar filters on other operational amplifiers, significantly reduces noise coupling and unwanted feedback through the distribution means of the bias power supplies. Typical values for resistors R313 and R314 are 5 to 10 ohms.

Digital Signal Processing (DSP) 280 and A/D converter 285 provide the principal digital functions for embodiment 300 of the common mode transmission line termination. DSP 280 analyzes and adjusts the frequency dependent performance of embodiment 300 through performance of mathematical calculations such as complex FETs and its control of the gain of amplifier 220 and adjustment of the values of passive elements comprising CM Z curve shaping adjuster 225. For DSL type applications and given that the transmission line impedances would not change rapidly, DSP 280 would typically be the modem DSP.

A/D converter 285 provides DSP 280 with a digital representation of the common mode signal present on the output buffer 210. In this configuration node N201 and node N318 would be the same. An alternative input for A/D converter 285 would be node N319 within amplifier 220. This would reduce potential below band interference such as ring signals and power line harmonic noise but would also reduce the ability of DSP 280 to detect and evaluate impacts of below band signals on the performance of line termination embodiment 300 as well as other elements of the DSL system. In this alternate configuration, node N201 and node N319 would be the same point in the circuit. A/D 285 provides embodiment 300 with feedback capability necessary for closed loop operation and performance optimization. In many applications, A/D converter 285 would be an integral part of DSP 280 and not a separate integrated circuit. Since application of DSP 280 and A/D converter 285 is straightforward for one skilled in the art, the digital circuits associated components and connections have been omitted from FIG. 3A.

Amplifier 220 is the primary gain control stage for common mode transmission line termination embodiment 300, and is comprised of operational amplifier U306, capacitors C312, C313, and C314, and resistors R315, R316, R317, R318, R319 and R320. The value of resistor R319 is variable, controlled by DSP 280, and used to set the gain of amplifier 220. Measuring the "open circuit" common mode signal present on the transmission lines and then injecting the match correcting error signal to reduce the signal amplitude 50% is basic operating mode of the present invention. DSP 280 controls this process by control of the gain of amplifier 220 and CM Z curve shaping adjuster 225 described below. Resistor R319 is the primary controlled element in amplifier 220.

Capacitors C313 and C314 together with their respective resistors R315 and R316, function as both bypass capacitors and low pass filters on the dc bias power inputs to U306. They function identically to the similar circuitry described previously as part of buffer 210. Capacitor C313 couples the positive bias power input for U306 at node N321 to ground. Resistor R315 couples the positive bias power input for U306 at node N321 to the positive bias power supply at node N303. Capacitor C314 couples the negative bias power input for U306 at node N322 to ground. Resistor R316 couples the negative bias power input for U306 at node N322 to the negative bias power supply at node N304.

Capacitor C312 with resistors R317 and R318 form a simple high pass filter designed to significantly reduce the amplitude of below band signals and noise, which typically can include the primary AC power frequency and its harmonics, telephone ring signals, low frequency radio transmissions, and crosstalk pickup from other telephone transmission lines. The lower cutoff frequency is selected to provide adequate attenuation of below band noise with insignificant impact on the system passband and communication signals. For a DSL system as illustrated in FIG. 2A, having transmission band low end at 25 KHz, approximately a 10 KHz filter 3 dB cutoff frequency is adequate. A more complex, higher order filter may be substituted where required to meet requirements for a specific design or application.

Resistor R317 and capacitor C312 are connected in series and the series combination couples the output of buffer 220 at node N318 to resistor R318 and the non-inverting input of U306 at node N319. Resistor R318 couples node N319 to ground, providing the ground reference for the high pass filter.

The values of resistors R319 and R320 jointly set the gain of operational amplifier U306 and thereby substantially the gain of amplifier 220. Resistor R319 is variable with its value typically controlled and selected by DSP 280. As such, resistor R319 may be implemented in a variety of ways most of which greatly exceed a single resistor in complexity. Implementations can range from a single, uncontrolled, selected test resistor or adjustable port to a switched resistor network including multiple resistors and FETs. Resistors R319 and R320 are coupled to the inverting input of operational amplifier U306 at node N320. Resistor R319 couples node N320 to ground. Resistor R320 couples node N320 to the output of operational amplifier U306 and the output from amplifier 220 at node N323.

The output of amplifier 200 is coupled to the interconnection point, node N200, for reference circuit legs of upper and lower current mirrors, comprising current mirror 240 and current mirror 250 respectively by network function CM Z curve shaping adjuster 225. As implemented in embodiment 300, CM Z curve shaping adjuster 225 is a tee network formed by capacitor C317 and resistors R333, R334, and R335. Resistor R333 couples the output of amplifier 220 at node N323 to the common tie point or Tee-node of CM Z curve shaping adjuster 225 at node N342. Resistor R335 couples Tee-node N342 to current mirror reference leg at node N200. The current injected into or removed from node N200 through resistor R335 is the "common mode match correction error signal". Resistors R333 and R335 are shown as fixed valued in FIG. 3A but can be variable depending on the specific application. Resistor R334 and capacitor C317 are connected in parallel and couple Tee-node N342 to ground. Resistor R334 and capacitor C317 are variable devices used to shape the frequency response of the error signal driving the current mirror reference leg at node N200. The values of resistor R334 and capacitor C317 are typically determined and set by DSP 280. Each component within the Tee network CM Z curve shaping adjuster 225 can be replaced by multi-component, complex impedance networks including multiple, variable, DSP controlled devices.

The common mode transmission line impedance match correction signal is applied to each individual conductor by a high impedance, AC coupled, push-pull drive circuit formed by portions of upper and lower current mirror circuits 240 and 250 of FIG. 2A. The reference currents for upper and lower current mirror circuits 240 and 250 are coupled to node N200 by resistors R200 and R201 respectively. In the absence of injection or removal of current, representing the "common mode match correction error signal", at node N200 through Tee network CM Z curve shaping adjuster 225, reference currents flowing through resistors R200 and R201 are equal.

The reference leg of upper current mirror 240 is composed of PNP transistor Q305 and resistors R337 and R339. Resistor R337 couples the emitter of transistor Q305 at node N344 to positive bias voltage V301 at node N303. Resistor R339 couples the base of transistor Q305 at node N348 to positive bias voltage V301 at node N303. The collector of Q305 at node N345 is coupled to resistor 200 opposite node N200 and the base of transistor Q305 at node N348. The base of transistor Q305 at node N348 is directly coupled to the base of the PNP mirror transistor in each push-pull drive circuit, comprising transistors Q301 and Q303 of FIG. 3A.

The reference leg of lower current mirror 250 is similarly composed of NPN transistor Q306 and resistors R336 and R338. Resistor R338 couples the emitter of transistor Q306 at node N347 to negative bias voltage V302 at node N304. Resistor R336 couples the base of transistor Q306 at node N343 to negative bias voltage V302 at node N304. The collector of Q306 at node N346 is coupled to resistor 200 opposite node N200 and the base of transistor Q306 at node N343. The base of transistor Q306 at node N343 is directly coupled to the base of the NPN mirror transistor in each push-pull drive circuit, comprising transistors Q302 and Q304 of FIG. 3A.

When the common mode signal on the transmission line conductors is positive with respect to ground, current is injected into node N200 from Tee network CM Z curve shaping adjuster 225. The injected current flows through resistor R201, raising the voltage of node N200 with respect to ground, increasing the current flowing in the reference leg of lower current mirror 250, and reducing the current flowing through resistor R200 and the current mirror reference leg of upper current mirror 240. Reference leg currents are mirrored in the respective push-pull drive circuit leg transistors, resulting in a decrease in the voltage at nodes N334 and N339. Current is then extracted from the transmission line conductors through coupling capacitors C315 and C316 that couple nodes N334 and N339 to the 2 transmission line conductors at nodes N301 and N302 respectively. This reduces the common mode signal present on the transmission line conductors and the resulting sensed common mode voltage at node N314. Node N200 then moves lower toward its neutral or matched impedance operating point in typical closed-loop, feedback circuit operation. The push-pull drive circuits are required to be high impedance in order to prevent them from loading the transmission lines with their circuitry rather than the injected match error correction signal current.

Capacitors C315 and C316 are not simply DC blocking capacitors. They will typically have nominal values that are identical to maintain balanced operation of the circuit. For most applications, capacitors C315 and C316 should have tolerances that are reasonably tight but commonly available such as +/−5%. Values for capacitors C315 and C316 should be chosen to present low impedance with minimal phase shift both at the bottom of and across the system signal transmission band of interest, and high impedance for low frequency AC power distribution frequencies including harmonics, as well as other low frequency system signals such as telephone ring signals.

Referring to FIG. 3A, it is apparent that each of the high impedance, AC coupled, push-pull drive circuits is substantially identical. As a result, only one such circuit and its operation will be described in detail. Circuit components in the second network corresponding to those in the first network simply will be identified by circuit designations without node or component connection information available in FIG. 3A.

The first push-pull drive circuit, driving capacitor C315, is comprised of upper current mirror PNP transistor Q301, lower current mirror NPN transistor Q302, resistors R329 and R330, and diodes D309 and D310. Corresponding components in the second push-pull drive circuit are PNP transistor Q303, NPN transistor Q304, resistors R331 and R332, and diodes D311 and D312. The first push-pull drive circuit also contains a feedback circuit comprised of circuit functions low pass filter and clamp protection 245, buffer 260, and amplifier 265 shown in FIG. 2A. The purpose, structure, and functioning of said feedback circuit will be discussed below. Corresponding circuit functions for the second push-pull drive circuit are low pass filter and clamp protection 255, buffer 270, and amplifier 275 shown in FIG. 2A.

In the first push-pull drive circuit, resistor R329 couples the emitter of transistor Q301 at node N332 to positive bias voltage V301 at node N303 and mirrors the current in resistor R337. The base of transistor Q301 is coupled to the base of transistor Q305 at node N348. The emitter of transistor Q301 at node N333 is coupled to the anode of diode D309. The cathode of diode D309 is coupled to the anode of diode D310, capacitor C315 and resistor R327 (the input signal source for the feedback loop referred to in the preceding paragraph). The cathode of diode D310 is coupled to the collector of transistor Q302 at node N335. The base of transistor Q302 is coupled to the base of transistor Q306 at node N343. The emitter of transistor Q302 at node N336 is coupled to resistors R328 (the output current signal for the feedback loop referred to in the preceding paragraph) and R330. Resistor R330 couples node N336 to negative bias voltage V302 at node N304 and mirrors the current in resistor R338.

The previously referenced feedback loops associated with each push-pull drive circuit have specific characteristics that enable or perform several functions. These are to set the nominal operating point for the coupling node near the midpoint of the push-pull circuit operating range, sense the location of the coupling node during match correction and return it to its nominal operating point very slowly (very long time constant), and provide gain for the feedback loop such that the coupling node can be maintained in it nominal operating condition.

The feedback loop for the first push-pull circuit includes operational amplifiers U302 and U304, diodes D307 and D308, capacitors C305, C306, C307, C308, and C309, and resistors R321, R322, R323, R324, R325, R326, R327 and R328. Corresponding components in the feedback loop for the second push-pull circuit are operational amplifiers U301 and U303, diodes D305 and D306, capacitors C301, C302, C303, C304, and C319, and resistors R301, R302, R303, R304, R305, R306, R308 and R307.

Referring to the feedback loop for the first push-pull circuit, diodes D307 and D308, capacitor C309 and resistor R327 comprise the feedback loop input circuit, specifically low pass filter and clamp protection 245 of FIG. 2A. The input signal for the feedback loop is the voltage to ground at node N334, which is coupled to the input of buffer 260 at node N331 through a low pass filter comprising resistor R327 and capacitor C309. Resistor R327 couples node N334 to node N331. Capacitor C309 couples node N331 to ground and should be a large value (with R327) to produce a very long time constant and response period for the feedback loop. Diode D307 couples node N331 (diode anode) to positive bias voltage V301 at node N303 (diode cathode). Diode D308 couples node N331 (diode cathode) to negative bias voltage V302 at node N304 (diode anode). Under normal operating conditions, diodes D307 and D308 are reverse biased and only serve to protect the buffer by limiting potential transients to approximately the bias power supplies levels.

Continuing to refer to the feedback loop for the first push-pull circuit, buffer 260 is composed of operational amplifier U304, capacitors C307 and C308, and resistors R325 and R326. Operational amplifier U304 is configured as a unity gain buffer amplifier. The input signal to U304 is coupled to the non-inverting input at node N331. The inverting input and output of U304 are coupled together and to the input resistor R323 of amplifier 265 at node N328. Capacitor C307 couples the positive bias power input of U304 at node N329 to ground and functions as a bypass capacitor. Similarly, capacitor C307 couples the negative bias power input of U304 at node N330 to ground and also functions as a bypass capacitor. Resistors R325 and R326 respectively couple the positive and negative bias power inputs of U304 at nodes N329 and N330 to the respective positive and negative bias power supplies V301 and V302 at node N303 and N304. Resistors R325, R326 with capacitors C307, C308 and comparable components associated with other integrated circuits significantly reduce noise coupling between integrated circuits through the power busses.

Continuing to refer to the feedback loop for the first push-pull circuit, amplifier 265 is composed of operational amplifier U302, capacitors C305 and C306, and resistors R321, R322, R323, R324 and R328. The input signal for amplifier 265 is the output of buffer 260, which is coupled to resistor R323 at node N328. Resistor R323 couples node N328 to the inverting input of U302 at node N324. The non-inverting input of U302 is coupled to ground. Resistor R324 couples node N328 to the output of U302 at node N327. Together resistors R323 and R324 set the gain of operational amplifier U302 and thereby amplifier 265. Capacitors C305 and C306 with resistors R321 and R322 perform the same bypass and filter functions for U302 as capacitors C307 and C308 and resistors R325 and R326 do for U304 in buffer 260. Resistor R328 couples the output of U302 at node N327 to the emitter of transistor Q302 at node N336. The current through resistor R328 constitutes the output signal of the feedback loop.

Continuing consideration of the earlier example where the common mode voltage sensed at node N314 moved positive producing a shift to lower voltage at node N334, thus resulting in sinking, through capacitor C315, of common mode signal from transmission line conductor at node N301. The lower voltage at node N334 resulted in a slow reduction of the voltages at nodes N331 and N328. Amplifier 265 must then sources current from its output at node N327 through resistor R324 into virtual ground node N324 and then through resistor R323 into node N328, which is at a negative voltage. Increased current flow through resistor R324 from node N327 to node N324 requires the voltage at node N327 to rise thereby causing additional current to flow through resistor R328 into node N336. The added current injected into node N336 reduces the current flowing through the collector of transistor Q302, which in turn causes the voltage at node N334 to creep slowly higher toward a midrange, nominal operating point. Meanwhile, with the reduction of the common mode signal on the transmission line through capacitor C315 producing a condition closer to matched condition, the detected common mode signal at node N314 should decline and the voltage at node N334 quickly rise. This in turn may overshoot the mark and require the slow feedback loop to lower the nominal voltage at node N334.

The above discussion demonstrates termination of common mode signal transmission lines for a classic 2 wire differential signal transmission line that one skilled in the art can readily extend to other forms. As previously discussed, however, common mode signals are easily generated by coupling of signals to conductors within circuits and between conductors and partial conversion of differential signals to common mode by impedance imbalances within circuits and transmission lines. As a result, common mode signal transmission lines can occur that are not readily thought of as transmission lines and such systems are frequently multi-conductor systems. A ribbon cable or printed data buss on a circuit board are two common examples.

In general, there are two approaches for termination of such multi-conductor systems. The first is to incorporate a 2-wire termination previously described between each pair of conductors. This approach has the advantage of providing near matched conditions for each line. The source of crosstalk noise is a distributed phenomena occurring along the entire length of the line where it is in proximity to other lines that are the sources of crosstalk noise, including out-of-phase re-coupling of the signal being transmitted on the line of interest. The distributed nature of the crosstalk noise source makes its best representation to be an infinite number of independent sources distributed along each wire in proximity to the transmission line of interest (this being similar to lumped parameter model representations of transmission lines). Though the coupling process is primarily linear so that superposition of the coupled noise signals is generally applicable, an infinite number of sources imply an infinite number of propagating signals that can only be handled in aggregate. The present invention effectively performs the aggregating function for the lines being terminated.

Having a two wire termination between each set of conductors is particularly useful because the coupling coefficient between any of said point noise sources and each point on any other line will vary significantly due to variation in distance of each line from said point noise source. However, this approach will quickly require massive amounts of circuitry as the number of lines increases. The passive embodiment, with potentially large components such as transformer T150 in FIG. 1F, is often impractical to implement for even 2-wire applications, much less for example, a 64-bit parallel data buss structure. The active embodiment with its ability to be largely integrated into a single integrated circuit is more often preferred.

For multi-conductor systems with a "large" number of common mode transmission line conductors, it is generally preferred not to attempt to provide an absolute match with zero reflection of common mode signals on each line, but provide improved matching conditions that significantly reduces reflected common mode signals, providing improved but not absolute matching. In this approach, the average of common mode signals present on all or a group of lines are detected and individual lines matched against this average rather than the open circuit common mode signal present on each specific line.

Referring to FIG. 2A and specific embodiment 300 illustrated in FIG. 3A, only 2 changes are required to implement said averaging approach. First, common mode sense 200 requires modification to provide an input from each transmission line conductor. This simply converts the series resistor network comprised of resistors R311 and R312 into a star configuration with resistors coupling node N314 to each transmission line conductor. All resistors in the star will typically have the same value although they can be varied to weight the contribution of individual lines to the composite common mode signal representation. Another alternative is to specifically match only one pair of lines and inject the same correction signal into the other lines open loop. This again improves overall matching conditions compared to the present open circuit, while reducing the amount of circuitry required for implementation.

The second change for each additional transmission line conductor is the addition of a high impedance, push-pull circuit for sourcing or sinking the common mode match correction error signal. A measure or estimate of the complexity of the drive stages (amount of circuitry) for actual matching of each pair versus simply providing improved matching can be easily determined. For a transmission line system of n conductors, the complexity factor for actual matching is approximately $2^n$-n instead of n for the improved matching approach. Thus for a 5 wire system, the ratio is 27/5 or 5.5 times the output drive circuitry to achieve actual matching. For a 64-bit buss, the ratio is approximately 2.8823e17 times larger, a total impossibility. The simpler implementation for a 64-bit bus would be large and complex, but at least feasible. An alternate approach that will frequently provide the best practical implementation for a common mode transmission line system having a large number of conductors is to provide actual matching for small groupings of the total, say 4 conductors per group. The average or weighting of each group can then be adjusted by the DSP based on the relative common mode signal level present in each group.

Figure 2B:
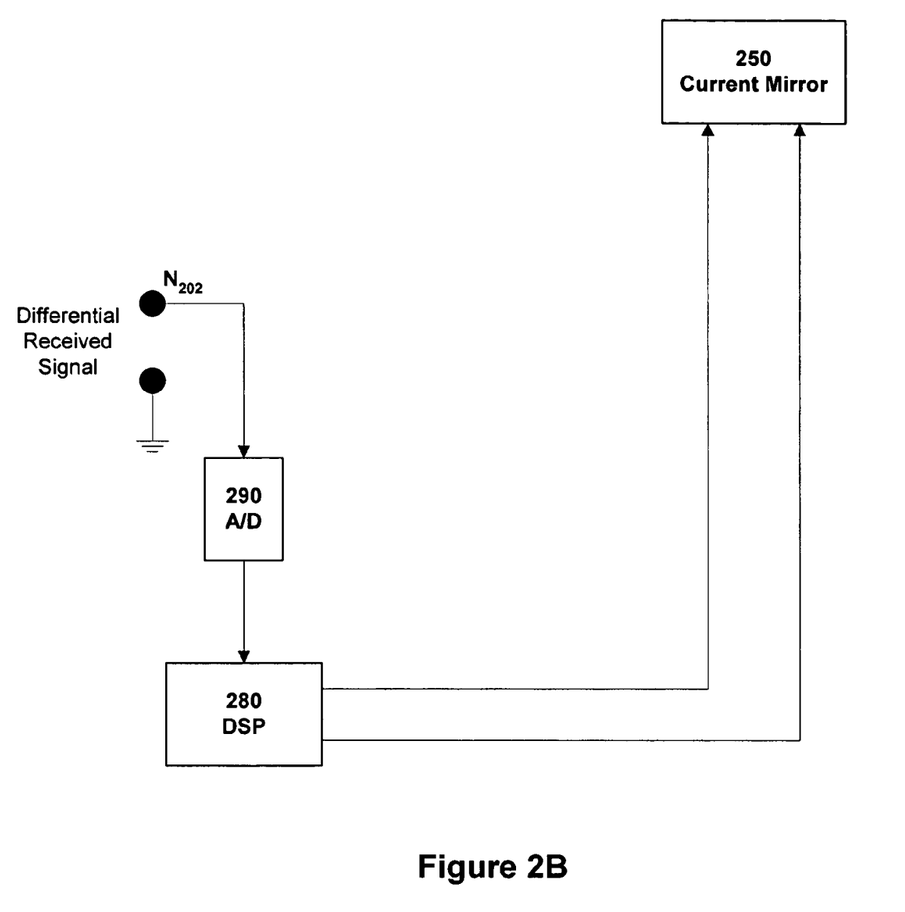
FIG. 2B is a block diagram showing functionality added to the embodiment of FIG. 2A providing independent fine adjustment for termination of each conductor in common mode transmission line structure.

In the previous discussion of the passive embodiment shown in FIG. 1G, it was pointed out that for some applications, common mode transmission line termination matching within a few percent was inadequate. As discussed, resistors R101 and R102 provide capability for a higher precision match in a passive embodiment. Similar capability can be provided to the embodiment of FIG. 2A. FIG. 2B is a block diagram illustrating the added functionality required to provide higher precision matching. The individual mirrored currents in each push-pull circuit leg within current mirror 250 are adjusted by control signals from DSP 280. DSP 280 determines the amount and direction by performing a correlation between the common mode crosstalk provided by A/D 280 of FIG. 2A and the converted common mode signal that is present on a sample of the differential output signal provided through A/D 290. DSP 280 adjusts the current balance to simultaneously maintain a best match condition for the common mode transmission line pair and minimize the differential noise that is correlated with it.

Figure 3B:
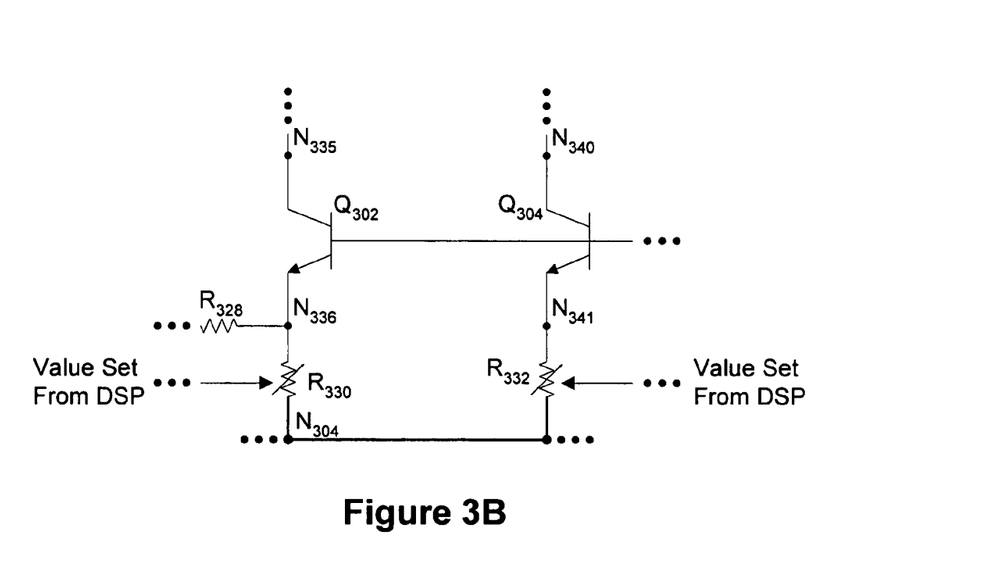
FIG. 3B is a circuit diagram of the implementation of the added functionality in the circuit shown in FIG. 3A.
Figure 3C:
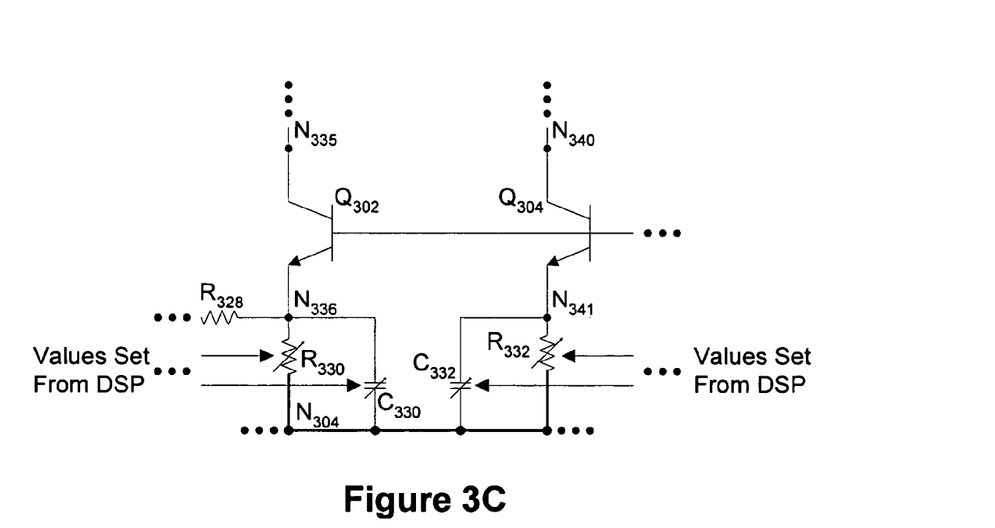
FIG. 3C is a circuit diagram of the circuit of FIG. 3B with added frequency dependent fine adjustment for termination of each conductor in common mode transmission line structure.

FIG. 3B shows another embodiment of the present invention implemented in the circuit of FIG. 3A. Resistors R330 and R332 are made variable with values controlled by DSP 280. FIG. 3C shows an embodiment with addition of variable bypass capacitors C330 and C332 in parallel with resistors R330 and R332. The addition of reactive components provides an additional means for matching both complex impedance of the line and improved matching across the operating frequency band. In real world implementation, more complex networks would likely replace the simple capacitors C330 and C332 shown.

Thus, a common mode transmission line termination is described in conjunction with one or more specific embodiments. The invention is defined by the following claims and their full scope of equivalents.

We claim:

1. An electronic circuit to provide termination for a plurality of common mode signals propagating in a transmission line structure, comprising:
    a transformer structure in an oppositional connection to substantially block a plurality of differential mode signals and transmit a plurality of common mode signals;
    a plurality of first variable components to optimize said plurality of common mode signals and terminate a plurality of common mode transmission line structures;
    a plurality of digital signal processor controlled second variable components;
    means for matching a common mode termination of said plurality of common mode transmission line structures over a communication system operating frequency band; and
    means for balancing each of a plurality of common mode transmission line terminations among a plurality of common mode signal conductors within said plurality of common mode transmission line structures.

2. The electronic circuit of claim 1 providing a complex impedance matched termination for each of said plurality of common mode transmission line structures.

3. The electronic circuit of claim 1 wherein said plurality of common mode signal conductors is more than 2.

* * * * *